Oct. 20, 1931.    R. F. HALL    1,827,845
AIRPLANE
Original Filed Oct. 18, 1926

Inventor
Randolph F. Hall
By
Attorney

Patented Oct. 20, 1931

1,827,845

UNITED STATES PATENT OFFICE

RANDOLPH F. HALL, OF ITHACA, NEW YORK

AIRPLANE

Original application filed October 18, 1926, Serial No. 142,493. Divided and this application filed February 11, 1928. Serial No. 253,732.

This invention relates to certain improvements in airplanes; and the nature and objects of the invention will be readily recognized and understood by those skilled in the art in the light of the following explanation and detailed description of the accompanying drawings illustrating what I at present consider to be the preferred embodiment or aerodynamical expression of my invention from among various other forms, arrangements, constructions and combinations of which the invention is capable within the spirit and scope thereof.

This application is a division of my pending application filed October 18, 1926, Serial No. 142,493, for improvements in airplanes, and embodies an invention particularly directed to those types of airplane wings or lift surfaces characterized by the use of an air displacement slot or passage, usually controlled by an auxiliary aerofoil, vane, or flap, by which the lift of the wing or surface is materially increased, and the lift maintained at increased angles of attack with the resulting retarding or practical elimination of the dangerous condition of the so-called "stall." In this general type of wing or lift surface various forms and arrangements thereof and therein may be resorted to in the provision or formation of the air displacement slots or passages, as for example, the formation of a slot or passage between an auxiliary aerofoil vane, or flap spaced from the wing or lift surface and mounted for operation to vary or control the slot or passage so formed; or by forming the slot or passage in and through the wing and providing an auxiliary aerofoil, vane or flap, or a plurality thereof, to control the flow or displacement of air through such slot or passage.

Control or operation of the slot or passage forming and/or controlling aerofoils, vanes, or flaps, is through the medium of pilot actuated means and mechanism, by which the pilot is enabled to adjust or vary the slot or passage in accordance with the varying flight conditions, as determined by the performance, maneuver, or the like it is desired to secure or perform. However, the successful and efficient functioning of such arrangements depends upon the personal element, the pilot, and are further complicated by construction and weight considerations, as well as the increase in the possibility of structural or mechanical failures due to the mechanism and structure necessarily required.

The primary object of and the basic principle involved in the present invention, is the automatic functioning and operation of a wing or lift surface air displacement slot or passage, to vary the slot or passage and control the displacement of air therethrough in accordance with the angle of attack at which such wing is flown, or other flight conditions to which subjected, so as to secure the desired results from the employment of such slots or passages in an aerodynamically and structurally and mechanically efficient manner.

The invention is characterized generally by a wing or lift surface of the slotted or air displacement passage type in which the functioning or operation of the auxiliary aerofoil, vane, or flap, or a plurality thereof, controlling, or controlling and forming, the slot or passage is automatic and determined by and in accordance with the angle of incidence or attack at which the wing is flown, so that, in the low incidence or attack angle conditions the slot or passage is either rendered inoperative or at a minimum effect, while through the high incidence or attack angle conditions the slot or passage is rendered operative to increase the lift with resulting, practical elimination of "stall" and the dangerous consequences thereof.

A further object of the invention resides in the mounting and arrangement of an auxiliary aerofoil, vane, or flap, on a wing in such a manner as to control the displacement of air through a wing slot or passage and be automatically operated by and in accordance with the angle of incidence or attack at which the wing is flown, which mounting and arrangement will be aerodynamically, structurally and mechanically efficient and practical and present a minimum possibility of failure in operation and use.

With the foregoing and certain other objects and results in view, which will be readily apparent from the hereinafter appearing explanation, the invention consists in certain novel features in design, mounting, and combinations of elements, as will be more fully and particularly referred to and specified hereinafter.

Referring to the accompanying drawings.

Figure 1:
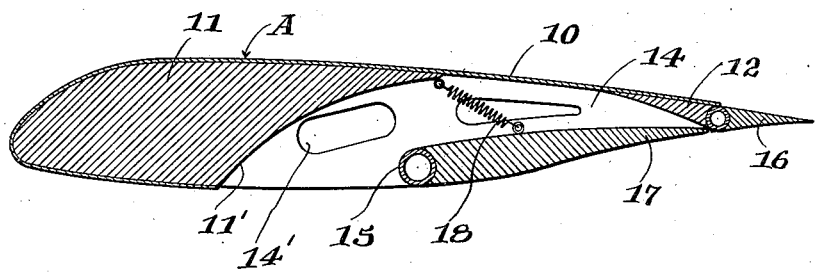
Fig. 1 is a vertical, transverse section, more or less diagrammatical, through a wing embodying the principles of my invention, and showing the wing at low angles of attack with the displacement passage closed by the auxiliary aerofoil.

The broad principles of the invention are exemplified by the particular form of wing and automatically functioning and operating auxiliary aerofoil or vane, as shown by the accompanying drawings, controlling displacement of air through the passage formed in the wing and between the wing and aerofoil or vane, but the form of the invention as shown is purely by way of example and not of limitation for the purpose of explaining and describing the principles and features of the invention in order to enable those skilled in the aeronautical art to understand the same. The principles of the invention are capable of a wide range of adaptations and embodiments to and with various forms and arrangements of slotted or air displacement passage types of wings or lift surfaces, and to various forms and types of auxiliary aerofoils, vanes, or flaps, and the mounting and arrangement thereof to obtain the automatic operation for controlling the wing slots or passages in accordance with the invention, which other forms, arrangements and types are included in and contemplated by the present invention.

In the illustrated example, referring now to the accompanying drawings, a main wing or lift surface A is provided having a relatively thin intermediate section 10 and a rellatively deep forward and leading edge portion or section 11, in which any desired form or type of forward wing beam or spar (not shown) can be mounted and included, as will be readily understood. The forward or leading edge portion 11 is inclined on its under side upwardly and rearwardly to and joining the intermediate wing section 10, and thus forms the inclined wall or surface 11'. A rear or trailing edge portion or section 12 is also formed on the wing A, which section decreases in width forwardly to and joins the intermediate section 10. A series of transverse members or ribs 14 are spaced at intervals along the span, transversely of wing A, and extending between forward section or portion 11 and the rear or trailing section or portion 12 of the wing, across the space between these sections. A rear wing beam or spar 15 is mounted extending through, across and fixed to the lower portions or sides of the ribs 14, disposed below the thin intermediate section 10 of the wing, between the forward and rear sections 11 and 12, with the ribs 14 cut away a distance upwardly from the beam 15, rearwardly to the trailing section 12 of the wing, as will be clear by reference to the drawings. The ribs 14 are formed with lightening or weight reducing holes or openings 14' therethrough in the space between the forward and rear sections 11 and 12 of the wing, which also form air passages as will be later explained. Any suitable lateral control surface or other controllable flap 16 is pivotally mounted on and extends rearwardly from the trailing edge of rear wing section 12, and is operated in the usual manner by any suitable mechanism (not shown).

An auxiliary aerofoil or vane 17 forming a lower wing or lift surface in the present example, is pivotally mounted at its leading edge on and to the rear wing beam or spar 15 for rotation thereon as an axis, and extends rearwardly across the space in the wing A below the intermediate section 10 thereof, to the under side of the trailing edge section 16 of wing A. The aerofoil or vane 17 at its limit of upward movement on spar 15, fits into or is disposed in the cut out portions of the wing ribs 14, with its trailing edge in effect engaging the under side of rear section 12, and thus extends over and across the rear portion of the air displacement passage formed through the wing between the aerofoil 17, and the wing A, as clearly shown by Fig. 1 of the accompanying drawings. This passage closing position of aerofoil 17 may be termed the normal position thereof and it is to be here noted that in such position the aerofoil 17 forms a part of the normal lower surface of and carries out the section or contour of wing A so that the assembly of upper and lower wings presents in effect a single wing. In order to normally draw and maintain the lower or auxiliary aerofoil 17 in the foregoing passage closing position, according to the particular example of the invention here presented, a coiled contractile spring 18 is connected and extends between the rear upper portion of leading edge section 11 of wing A, and the intermediate portion of the auxiliary aerofoil or vane 17. The member 18 is designed and mounted so as to normally draw and maintain aerofoil 17 in raised passage closing position as shown by Fig. 1, but to permit of downward swinging of the aerofoil on spar 15 to passage opening position as shown in Fig. 2, upon the application of downwardly acting forces of sufficient magnitude to overcome the spring 18.

The wing A and auxiliary aerofoil or vane 17, formed and arranged as above described provide one form or type of air displacement passage wing, in which a passage is formed through wing A between aerofoil 17 and wing A, having its intake or inlet end opening through the lower or under side or surface of the wing to the rear of and normally forwardly closed by the forward or leading edge section 11, and having its discharge or outlet end through the rear or trailing portion of the lower or under side of the wing, which discharge is controlled by the aerofoil or vane 17, automatically in accordance with the angle of attack of the wing as will be hereinafter explained. The passage so formed is in effect divided into a series of passages by the wing ribs 14 but these passages are in the present example, although not so limited, placed in intercommunication through the holes or openings 14' in ribs 14.

Figure 2:
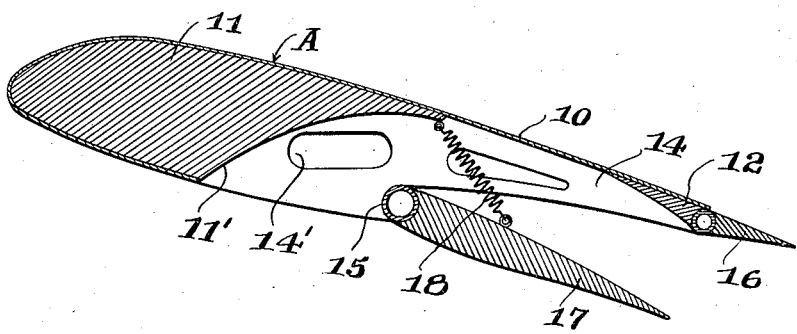
Fig. 2 is a view similar to Fig. 1, but showing the wing at high angles of attack with the displacement passage automatically opened by the auxiliary aerofoil.

Now, in flight operation of the wing A at low incidence or attack angles, such as diagrammatically indicated by Fig. 1 of the drawings, the forward or intake end of the air displacement passage is in effect closed by the leading edge section 11 of wing A and there is no appreciable or substantial intake or inflow of air into the wing passage, as the wing moves forwardly in flight, the air passing rearwardly across the passage inlet. Under these conditions, the auxiliary aerofoil or vane 17 is maintained in raised position by spring member 18, across and closing the rear or discharge end of the wing passage, with the aerofoil 17 in the example here of forming, and carrying out the normal contour of wing A.

Upon an increase in the incidence or attack angles sufficient to elevate the leading edge section 11 of wing A and forwardly expose the inlet or intake end of the wing passage to the airstream, air enters the passage and passes rearwardly therethrough and then downwardly to the aerofoil or vane 17. The entry of air and passage thereof through the wing displacement passage, builds up or creates a pressure acting downwardly upon the aerofoil 17 at the discharge end of the passage which forces aerofoil 17 downwardly and opens the rear or discharge end of the passage, as shown by Fig. 2 of the drawings. With aerofoil 17 in downwardly swung passage opening position, the air from the passage in the wing is discharged downwardly and a flow and displacement of air takes place through the passage with the material increase in the lift developed by main wing A and aerofoil 17. The speed range of an airplane with such wing is increased by the foregoing action. Without loss of lift and without reaching a condition of "stall", so that, the condition of "stall" is materially retarded and practically eliminated.

The operation of the wing and auxiliary aerofoil or vane 17 is entirely automatic in the control of the air displacement passage and is dependent upon and caused to function or operate by and in accordance with the angle of attack at which the wing is flown. In this manner the necessity of pilot actuated mechanism for controlling the displacement passage is eliminated, and the action of the passage to increase the lift is automatically caused to function in the required degree as the angle of attack is increased, so that the possibility of inadvertently reaching a condition of "stall", is practically done away with. On decreasing the angle of attack to the low angle condition, the aerofoil 17 on release of pressure thereon is returned to normal passage closing position by the spring member 18, as will be clear from the foregoing.

While a rearwardly positioned passage controlling aerofoil or vane is here disclosed, forwardly positioned aerofoils can be employed to control the intake end of a passage if desired, as will be readily apparent, or both forward and rear aerofoils utilized. Likewise, passages or slots can be formed by spacing aerofoils or vanes from the wing at any suitable or desired portions of or locations on the wing and the displacement flow automatically controlled by movements of the aerofoils to increase or decrease the size of the passages or slots in accordance with the attack angles. The example hereof discloses spring means for maintaining the aerofoil in passage closing position at low angles of attack, but the invention is not so restricted, as other means or mechanisms can be employed, and further the invention contemplates and includes within the broad principles thereof, the mounting of auxiliary aerofoils, vanes, or flaps in such a manner as to utilize the action of the air flow to actuate them in controlling the passages or slots without employing mechanical or such like means such as the spring shown as an example herein.

It will also be evident that various other changes, additions, substitutions, variations, and changes might be resorted to without departing from the spirit and scope of my invention, and hence I do not desire to limit myself to the exact and specific disclosures hereof.

What I claim is:

1. An airplane wing formed with a relatively thin intermediate section with respect to the forward and leading edge section, an aerofoil pivotally mounted on said wing spaced below said intermediate section with its leading edge spaced rearwardly from said forward section, said aerofoil forming an air displacement passage between the wing and such aerofoil having its inlet end between the forward wing section and the aerofoil and swingable to positions closing the rear discharge end of the passage or opening the same, and means normally maintaining the aerofoil in passage closing position forming a part of the contour of said wing with the latter at low angles of attack, said aerofoil swung to passage opening position with the wing at high angles of attack by pressure of air in said passages.

2. An airplane wing embodying spaced aerofoils forming an air displacement passage therebetween, the upper aerofoil having a leading edge section depending downwardly to and spaced forwardly from the leading edge of the lower aerofoil, and said lower aerofoil mounted for upward swinging to position closing the air displacement passage.

3. In an airplane wing, an aerofoil mounted on the wing to form an air displacement passage between the wing and such aerofoil and movable from and toward the wing to open and close the passage, and the said aerofoil controlled by variations in airflow pressures acting thereon to move to position opening the passage under high attack angle conditions, and to move to position substantially closing the passage under low attack angle conditions.

4. In an airplane wing, an aerofoil mounted on the wing to form an air-displacement passage between the wing and such aerofoil and movable from and toward the wing to open and close the passage, means normally maintaining the aerofoil in position closing the passage, and the said aerofoil controlled by variations in airflow pressures acting thereon to move to position opening the passage under high attack angle conditions, and to move to position closing the passage under normal or low attack angle conditions.

5. The combination with an airplane wing, of an aerofoil mounted on the wing to form a passage between the wing and the aerofoil for displacement of air therethrough to increase or maintain the wing lift, said aerofoil movable toward and from the wing to substantially close said passage against displacement of air and to open said passage for displacement of air, and the said aerofoil automatically operated and controlled to open and close the passage by and in accordance with the airflow pressures acting thereon.

6. The combination with an airplane wing, of an aerofoil mounted on the wing to form a passage between the wing and the aerofoil for displacement of air therethrough to increase or maintain the lift of the wing, the aerofoil in normal position substantially closing the passage and forming a part of and substantially within the normal wing contour, and the said aerofoil movable from normal passage closing position to position opening the passage for displacement of air therethrough by the action of airflow pressures thereon with the wing subjected to high attack angle conditions.

7. An airplane wing embodying spaced aerofoils forming an air displacement passage therebetween, one of said aerofoils swingably mounted for movement toward the other aerofoil to position closing the displacement passage, and for movement from the other aerofoil to position opening the displacement passage, and the said swingably mounted aerofoil maintained in position substantially closing the passage by the airflow pressure acting thereon with the wing at low attack angles, and said aerofoil swung to position opening the passage by the airflow pressures within the passage with the wing at high angles of attack.

8. An airplane wing embodying spaced aerofoils forming an air displacement passage therebetween, the upper aerofoil having a leading edge section depending downwardly and spaced forwardly from the lower aerofoil, the said lower aerofoil pivotally mounted for upward swinging to position closing the displacement passage, and the pivotally mounted lower aerofoil maintained in passage closing position by the airflow pressures acting on the lower side thereof with the wing under low attack angle conditions, and swung downwardly to passage opening position by the airflow pressures within the passage with the wing under high attack angle conditions.

9. In an airplane wing, a pivotally mounted flap member forming a portion of the under surface of the wing intermediate the leading and trailing edges of the wing and providing an air displacement passage between the wing and the flap, said member in normal upwardly swung position closing the passage and in downwardly swung position opening the passage and changing the camber of the wing under surface, and the said member automatically operated by the airflow pressures thereon to swing to downward passage opening position with the wing at high angles of attack, and with the wing at low angles of attack to swing to normal position closing the passage.

10. In an airplane wing, a vertically swingable flap member forming a portion of the under surface of the wing and providing an air displacement passage between the wing and the flap member, said member in normal upwardly swung position substantially closing the passage and in downwardly swung position opening the passage for flow of air therethrough to maintain or increase wing lift, and the said flap member actuated and controlled by varying airflow pressures acting thereon, to swing to downward position opening the passage with the wing under high attack angle conditions, and to swing upwardly to normal position closing the passage with the wing under low attack angle conditions.

11. An airplane wing having an air displacement passage extending rearwardly therethrough and discharging therefrom adjacent the wing trailing edge, a flap member forming a portion of the wing under surface and in normal raised position substantially closing the wing displacement passage, said member in lowered position opening the passage for flow of air therethrough to maintain or increase wing lift, and the said flap member actuated by variations in air pressure acting thereon to open the passage with the wing under high attack angle conditions, and to substantially close the passage with the wing under low attack angle conditions.

12. An airplane wing provided with an air displacement passage extending rearwardly therethrough with the forward inlet end thereof opening through the under side of the wing and the rear discharge end thereof opening through the under side of the wing adjacent the trailing edge thereof, a movable member mounted on the wing for opening and closing the rear discharge end of said passage, and the said member actuated and controlled by variations in airflow pressures acting on the wing in accordance with wing flight conditions to open the discharge end of the passage for flow of air therethrough to maintain or increase wing lift with the wing under high attack angle or low speed conditions, and to substantially close the passage against flow therethrough with the wing under low attack angle or high speed conditions.

13. An airplane wing provided with an air displacement passage extending rearwardly therethrough with the forward inlet end thereof opening downwardly through the under side of the wing adjacent but spaced from the wing leading edge and the rear discharge end thereof opening downwardly through the under side of the wing adjacent the wing trailing edge, a vertically swingable wind flap member forming a portion of the wing under surface extending across and in raised position substantially closing the discharge end of the passage, said member in lowered position opening the discharge end of the passage and increasing the camber of the wing, and the said flap member actuated and controlled by varying airflow pressures acting thereon to swing downwardly to wing camber increasing position opening the discharge end of the passage for flow of air therethrough to maintain or increase wing lift with the wing under high angle of attack or low speed conditions, and to swing upwardly to position substantially closing the passage with the wing under low angle of attack or high speed conditions.

14. In an airplane wing, a vertically swingable rear flap thereon in normal raised position carrying out the normal contour of the wing and in lowered positions increasing the camber of the wing to maintain or increase wing lift, yielding means normally maintaining said flap in normal raised position with the wing at rest, and the said rear flap automatically actuated with the wing in flight by air pressures acting thereon to swing downwardly against said yielding means to wing camber increasing position with the wing under high angle of attack conditions, and to swing upwardly to normal raised position with the wing under low attack angle conditions.

15. In an airplane wing having an air displacement passage extending rearwardly therethrough with its discharge outlet adjacent the wing trailing edge, a vertically swingable rear flap member on the wing, said rear flap in normal raised position carrying out the normal contour of the wing and substantially closing the discharge end of said passage, and in lowered positions opening the passage and increasing the camber of the wing to maintain or increase wing lift, yielding means normally maintaining said flap in normal raised position with the wing at rest, and the said rear flap automatically actuated with the wing in flight by air pressures acting thereon to swing downwardly against said yielding means to passage opening and wing camber increasing positions with the wing under high angle of attack conditions, and to swing upwardly to normal raised passage closing position with the wing under low attack angle conditions.

16. An airplane wing provided with an air displacement passage extending rearwardly therethrough with the forward inlet end thereof opening downwardly through the under side of the wing adjacent but spaced from the wing leading edge or forward portion of the wing, and the rear discharge end thereof opening downwardly through the under side of the wing adjacent the wing trailing edge, whereby air is displaced rearwardly through said passage with the wing at high angles of attack to maintain or increase wing lift, and with the wing at low angles of attack entry of air into the inlet end of and displacement of air rearwardly through said wing passage is substantially stopped by the leading edge or forward portion of the wing.

Signed at Ithaca, New York, this 28th day of Jan., 1928.

RANDOLPH F. HALL.